United States Patent [19]
Söderqvist et al.

[11] Patent Number: 6,104,814
[45] Date of Patent: Aug. 15, 2000

[54] METHOD AND APPARATUS FOR JAMMING DIFFERENT TELEVISION CHANNELS USING AN OSCILLATOR CIRCUIT OSCILLATING AT DIFFERENT FREQUENCY BANDS

[75] Inventors: Rickard Söderqvist; Mats Bladh, both of Tullinge, Sweden

[73] Assignee: Telefonaktiebolaget LM Ericsson, Stockholm, Sweden

[21] Appl. No.: 08/928,967

[22] Filed: Sep. 12, 1997

[30] Foreign Application Priority Data

Sep. 13, 1996 [SE] Sweden .................................. 9603381

[51] Int. Cl.[7] .................................................. H04N 7/167
[52] U.S. Cl. ............................................................ 380/205
[58] Field of Search .................. 380/28, 29, 37, 380/42

[56] References Cited

U.S. PATENT DOCUMENTS

| | | |
|---|---|---|
| 4,792,971 | 12/1988 | Uemura . |
| 4,912,760 | 3/1990 | West, Jr. et al. . |
| 5,140,633 | 8/1992 | Gurusami et al. . |
| 5,276,734 | 1/1994 | Hashimoto . |
| 5,278,908 | 1/1994 | Parikh et al. ............................. 380/7 |
| 5,287,539 | 2/1994 | West, Jr. . |
| 5,355,410 | 10/1994 | Blais et al. . |
| 5,371,417 | 12/1994 | Mirov et al. ............................. 327/115 |
| 5,467,397 | 11/1995 | West et al. . |

OTHER PUBLICATIONS

Ralph J. Smith, Dircuits, Devices and Systems 4e, John Wiley, 1983.
Richard V. Andree, Selections from Modern Abstract Algebra 2e, Holt, Rinehart and Winston, Inc., 1971.
Kemeny, Snell, and Thompson, Introduction to Finite Mathematics, Prentice–Hall Inc., 1961.

*Primary Examiner*—Gail O. Hayes
*Assistant Examiner*—James Seal
*Attorney, Agent, or Firm*—Burns, Doane, Swecker & Mathis, L.L.P.

[57] ABSTRACT

In a system for jamming television programs in a cable television system, modified oscillators are used to provide jamming signals to control ports where they are added to the video signal, in order to prevent unauthorized viewing. The oscillators have switchable portions so that they, when receiving appropriate control signals from a control unit on control lines, can be switched to different basic oscillation frequencies and thus each one can cover a very wide frequency range. The basic oscillation frequency of the oscillators is finely adjusted by means of a continuous signal on a line like the conventional voltage control of oscillators. The use of such switched oscillators in an interdiction apparatus for a cable television system provides a number of advantages, such as making the system more flexible and more efficient in terms of jamming capacity for more expensive programs, pay channels, needed oscillator circuitry, etc.

11 Claims, 4 Drawing Sheets

METHOD AND APPARATUS FOR JAMMING DIFFERENT TELEVISION CHANNELS USING AN OSCILLATOR CIRCUIT OSCILLATING AT DIFFERENT FREQUENCY BANDS

TECHNICAL FIELD

The present invention relates to a method and an apparatus for jamming signals in a cable television System, in particular for interdicting unauthorized viewing.

BACKGROUND

In a cable television subscriber network of a star-net type, the television signals are usually transmitted on a broadband line from headends of the cable television system to different splitting points. The television spectrum is divided in to different frequency bands called channels on which different television programs are transmitted by means of an amplitude modulated VSB signal. Different subscribers are then connected to these splitting points in which the television channels for which the subscriber subscribes are provided, and in which other channels are jammed, in particular premium television channels, in order to prevent unauthorized viewing.

At the headend of the cable television system there is usually provided a unit for controlling the system and managing all data traffic between the headend and the splitting points, which for example can comprise an interdiction apparatus, and giving instructions to devices located in the splitting points, such as the interdiction apparatus.

U.S. Pat. No. 4,912,760 describes a cable television interdiction apparatus having means for controlling a plurality of voltage controlled oscillators for selectively jamming only unauthorized premium programming transmitted in clear from a headend to a particular subscriber.

U.S. Pat. No. 4,792,971 describes a cable television system having means for controlling viewing access to different designated television channels.

U.S. Pat. No. 5,467,397 discloses a cable television interdiction apparatus comprising a micro-processor and control means for controlling voltage controlled oscillators used for selectively jamming unauthorized premium programming transmitted from a headend to a particular subscriber.

In the above cited patents several conventional voltage controlled oscillators are used for jamming a particular part of the frequency band each. Such oscillators then cover the frequency range from a certain frequency to around twice that frequency, i.e. f→2f. However, if a better accuracy of the frequency control of the oscillator is desired the frequency range thereof can be lowered.

This results in that, in order to jam a television signal which ranges over a large frequency band, usually being larger than from the lowest frequency to the double frequency, e.g. from f to 4f, several jamming oscillators are required.

For example, in a conventional cable television system making use of the entire frequency range, ranging from 47 MHz to around 550 MHz, a number of different conventional voltage controlled oscillators are required only for covering the entire bandwidth. A particular oscillator jams the different channels transmitted in a particular frequency range according to some pattern or at random by means of transmitting a signal pulse for a short time for a particular channel and then hop to another frequency in order to jam another channel.

In the prior art technique, if several premium or pay television channels are located closely in frequency, there is a problem to efficiently jam these for unauthorized viewing, since the number of programs that a jamming oscillator can jam per cycle, is limited. Thus, in order to provide an efficient jamming of a program, several jammings per cycle may be required. Moreover, in some cases it is also desired to jam the sound. This of course adds additional requirements on the oscillators, often resulting in that the capacity of a particular oscillator intended to jam a certain frequency band, is insufficient.

SUMMARY OF THE INVENTION

It is an objective of the invention to overcome the problem associated with the prior art technique and to provide a more flexible and inexpensive cable television jamming system.

This objective is obtained by means of using one or several modified oscillators, in particular voltage controlled oscillators, for interdicting television programs, each such oscillator covering a wide frequency range, in particular the same wide frequency range being used by all oscillators.

Such a modified oscillator is obtained by dividing a conventional oscillator circuit into a fixed part and a switched part, where the switched part comprises suitable switching elements for changing the portion of the switched part used in the actual oscillating circuit to another portion of the switched part. This switching will give the actual oscillating circuit different characteristics and thus different frequencies. The fixed part can be controlled by a control or scanning voltage for adjusting the frequency finely, i.e. continuously within a narrow frequency range, e.g. as in conventional voltage controlled oscillators.

The use of such modified oscillators results in that one single oscillator can jam the entire television frequency band, and by adding other oscillators of the same kind these can more efficiently jam premium or pay television programs, even if many premium or pay channels are located close in frequency.

Thus, by using an oscillator capable of jamming a broader frequency band in an interdiction apparatus for cable television, several benefits and advantages have been found. These benefits and advantages include, increased flexibility, fewer electronic components and less lines are required for obtaining an efficient jamming, thus reducing the cost of a jamming device.

DESCRIPTION OF THE DRAWINGS

The present invention will now be described in more detail by way of non-limiting examples and with reference to the accompanying drawings, in which.

DETAILED DESCRIPTION

Figure 1:
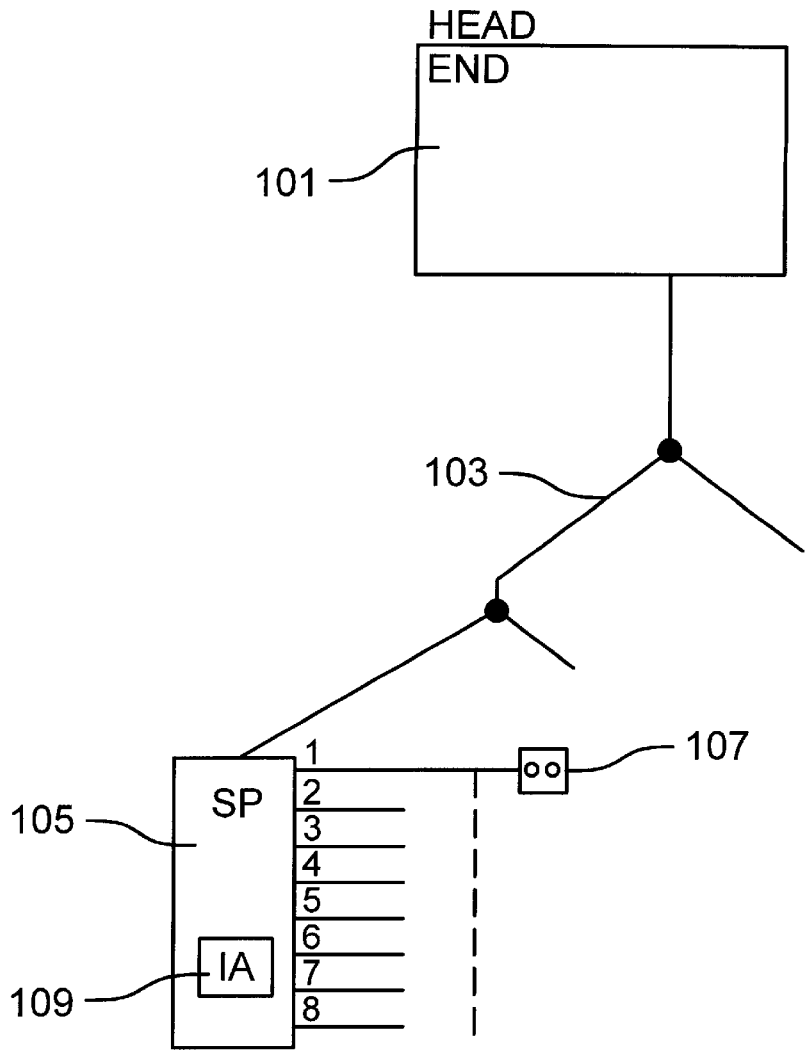
FIG. 1 is a general view of a cable television network of star-net type.

FIG. 1 shows the general configuration of a cable television network of a star-net type. In such a network the center node is called a headend 101. The headend 101 usually transmits a large number of television programs on different channels in clear on a transmission line 103. The large number of television programs normally existing in a cable television network requires a large bandwidth in order make it possible to transmit them. In a typical cable television network the frequency band used ranges from around 47 MHz up to around 550 MHz, and is usually divided into different bands according to set standards.

The signal is then received in different splitting points 105 located around the headend 101. The splitting points 105 are used to connect individual subscribers 107 to the cable television network. These different individual subscribers usually subscribe to different channels or programs supplied from the headend 101. Thus, in order to provide each subscriber with the correct set of television programs, some kind of interdiction apparatus must be arranged between the headend 101 and a particular subscriber 107 if the television programs are transmitted in clear from the headend 101, and if unauthorized viewing is to be prevented. Such an interdiction apparatus 109 is usually located in the splitting point 105 where it selectively jams different television channels for different subscribers, in a well known manner, for example as described in the above cited patent U.S. Pat. No. 4,912,760.

Figure 2:
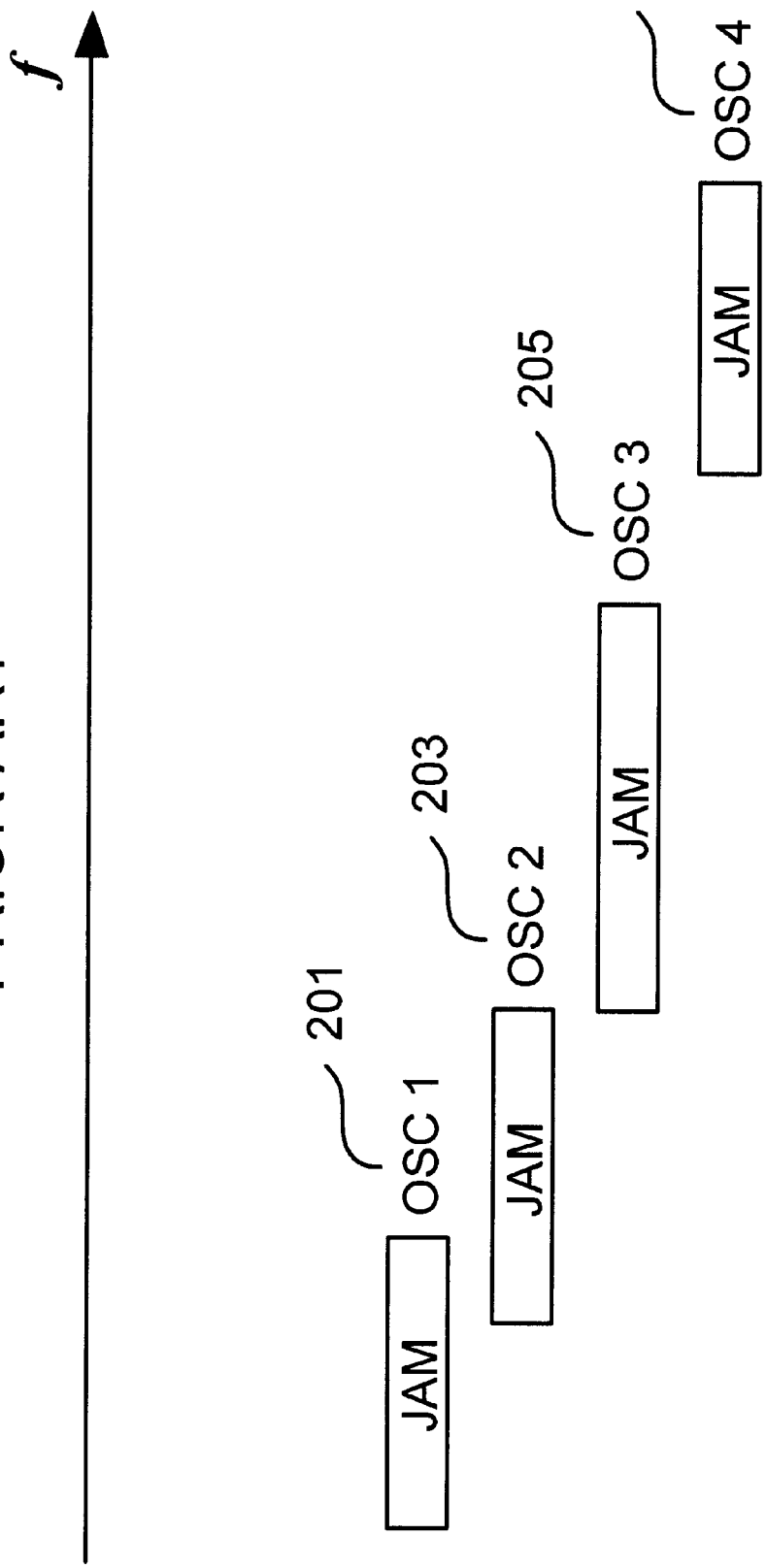
FIG. 2 is a diagram of the prior art showing the frequency allocation for several conventional jamming oscillators.

In FIG. 2 the jamming as carried out in one type of prior art interdiction apparatus is illustrated by a frequency diagram. Thus, FIG. 2 shows how different conventional voltage controlled oscillators 201, 203, 205 and 207 are used to jam different intervals of the total frequency range used for transmission of a television signal. Each oscillator hops between different frequencies within their particular frequency range in order to jam different television channels, which are transmitted in that particular frequency range.

In this manner the total frequency band can be covered by means of conventional oscillators jamming television channels located in different parts of the transmitted broadband television signal.

Figure 3:
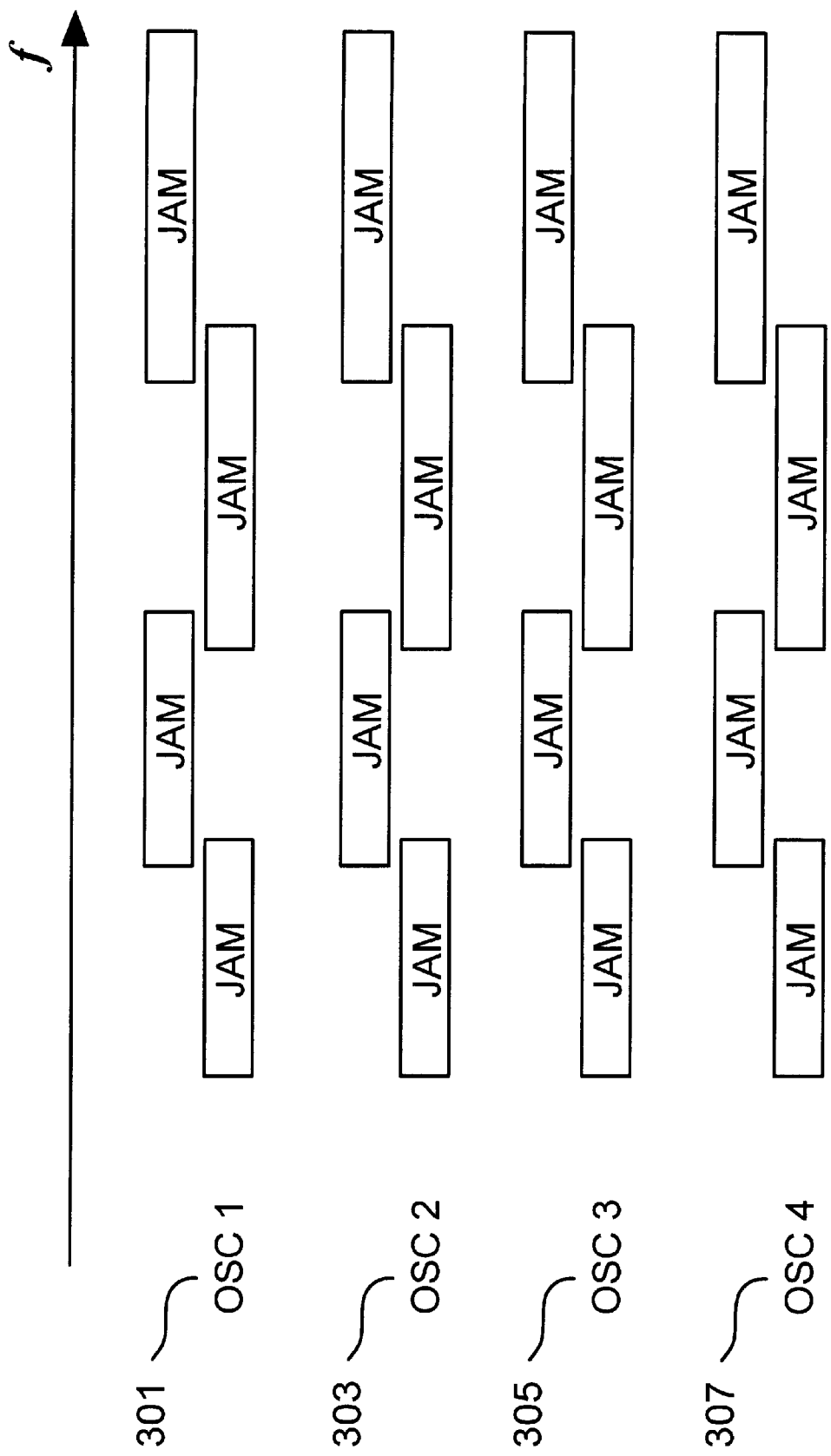
FIG. 3 is a diagram showing the frequency allocation for several modified jamming oscillators.

In FIG. 3, different oscillators 301, 303, 305 and 307 are shown. In this case the oscillators 301–307 are modified, so that each oscillator 301–307 can jam any television channel transmitted from a headend to a particular subscriber. In a preferred embodiment the oscillators 301–307 are voltage controlled oscillators which are modified to include switching facilities as will be described hereinafter. This arrangement provides a number of advantages compared to the prior art technique. Such an advantage can be that the number of oscillators required in each interdiction apparatus can be reduced, and that thereby the number of components and lines are reduced, resulting in a less expensive implementation of the interdiction apparatus.

Figure 5:
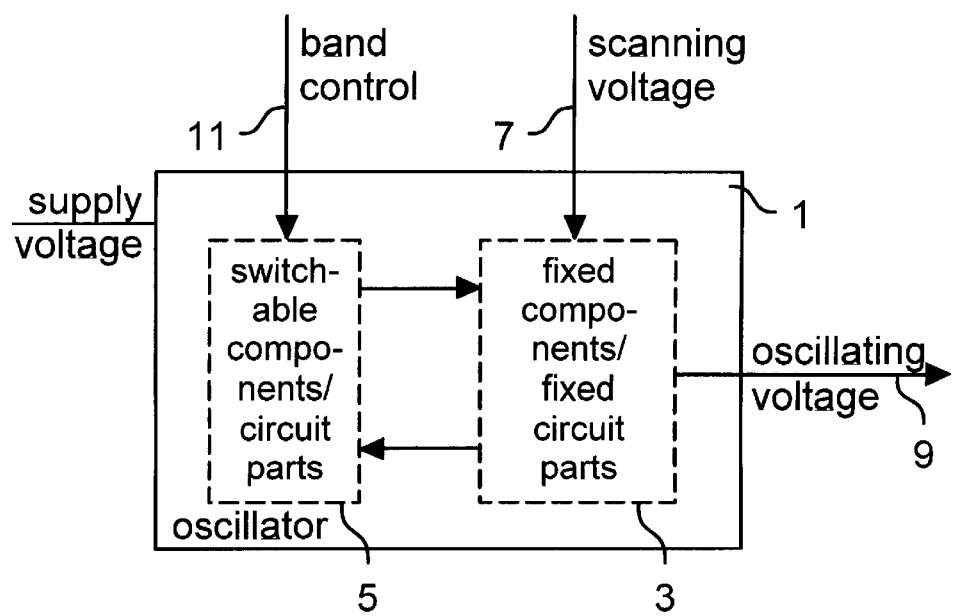
FIG. 5 is a schematic diagram of a modified oscillator.

The basic layout of such a modified oscillator 301–307 is illustrated by FIG. 5. A voltage controlled oscillator 1 of some conventional construction is divided in fixed part 3 and a switched part 5. The fixed part 3 comprises fixed components and lines therebetween or generally fixed circuits and to this part also a line 7 is connected for a fine control of the frequency as obtained on the output line 9 of the oscillator 1. The switched or switchable part 5 comprises circuit parts or components that can be switched to operate in a different way, such as that different passive components are switched to other components having other characteristics.

The switching can be accomplished by introducing also some switching elements, e.g., transistors. A line 11 is connected to the second part 5 causing it to operate in a different manner when energized, giving another condition of oscillation to the oscillator circuit 1 and thus a frequency that can be very different from that obtained from the oscillator 1 in the case where the band control line 11 is not energized. It is obvious that this oscillator design comprises fewer components and will require less space on a circuit board than several, distinct oscillators.

Also, the flexibility of the interdiction system is significantly increased. For example, a first oscillator 301 can be used for a basic jamming of all television channels and the remaining jamming oscillators can be controlled to efficiently jam more expensive television programs, such as pay channels or premium television channels and/or the sound of such channels.

In another preferred embodiment the oscillators are controlled to share the basic jamming between themselves, and use the time of a jam cycle left after such a basic jamming for additional jamming of more expensive television channels. For example, if the number of jamming oscillators is two, the jamming can be carried out in the following manner: First the two oscillators help each other in jamming all the channels to be jammed, e.g. the first oscillator jams the first channel to be jammed, the second oscillator jams the second channel to be jammed, then the first oscillator jams the third channel to be jammed, and so on. After that the two oscillators in this manner have provided the basic jamming they are controlled to perform an additional jamming of certain, in particular expensive, channels, during the remaining jam cycle.

For example, with reference to FIG. 2, if many pay television or premium television programs are transmitted in a particular band, a single jamming oscillator arranged to jam this part of the frequency range may be overloaded and insufficient to provide an efficient jamming of remaining channels. This is due to the fact that the number of channels that one oscillator can jam during one jam cycle is limited.

Thus, using the prior art arrangement as shown in FIG. 2, one or several of the pay or premium television channels may be jammed but not in a satisfying manner. That is, the television picture received by an unauthorized subscriber for a certain pay channel may be possible to view, although it may have a lower quality.

However, with the arrangement as illustrated in FIG. 3 the problem outlined above can be effectively avoided without having to use additional jamming oscillators. This can be done in a number of ways. For example, a first oscillator 301 can provide a basic jamming of all television channels. The remaining jamming oscillators are then programmed or controlled from the headend to provide additional jamming which can be programmed to jam more expensive pay channels or premium channels more often and thereby more efficiently.

Figure 4:
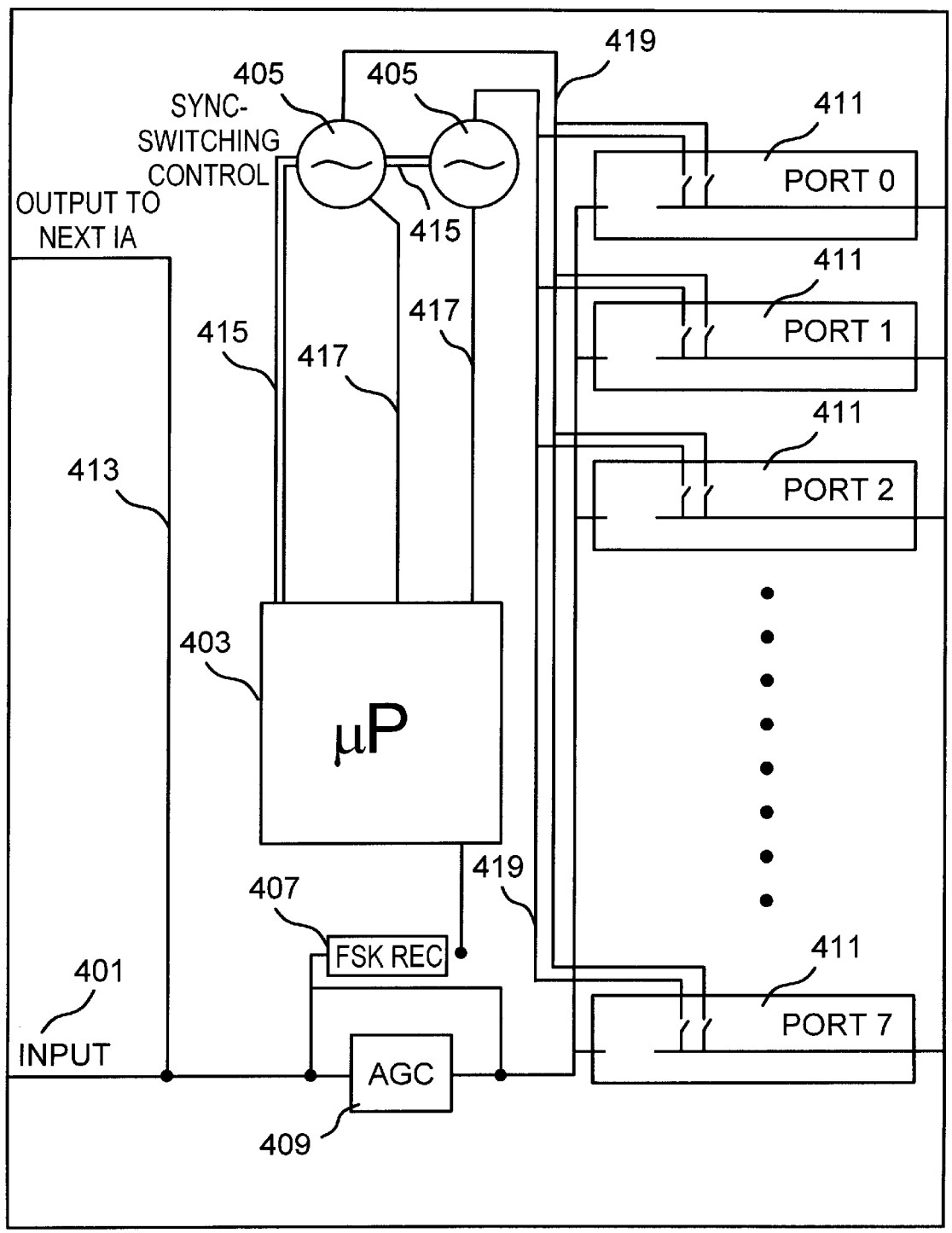
FIG. 4 is a schematic block diagram of an interdiction apparatus.

In FIG. 4 a schematic block diagram of an interdiction apparatus making use of modified oscillators is shown. Thus the input signal at 401 comprises both a television signal and a frequency shift keying (FSK) signal. The FSK signal is used for, amongst others, providing a microprocessor 403 with information on how to control a number of jamming oscillators 405.

Thus, the input signal that enters the interdiction apparatus, shown in FIG. 4, is fed to the microprocessor 403 via an Automatic Gain Control (AGC) block 409, which outputs the input signal at a suitable level, and a FSK receiving block 407 which receives and decodes the gain controlled FSK signal being part of the input signal. The output signal from block 409, the television signal, is also fed to a number of different output ports PORT 0–PORT 7, respectively, shown at 411.

Furthermore, the input signal is by-passed to a possible downstream serially connected interdiction apparatus via a line 413. Based on the information provided from the headend, the microprocessor 403 then controls the different oscillators 405 via the line 415 on which band control signals are transmitted and via the lines 417 on which information regarding the oscillator frequency and levels is transmitted.

The output from the different oscillators, i.e. the jamming signals, are then fed to the different output ports 411 on lines 419 where they are added to the television signal in some known manner. Different subscribers are then connected to the different ports 411 and the television signal output via these ports are jammed according to the information provided to the microprocessor 403 from the headend.

Also, it should be noted that usually the frequency control and level control of the oscillators 405 is more advanced and that usually some form of feedback is used in order to set a correct output frequency and level. This is well known technique, see for example the above cited U.S. Pat. No. 5,467,397, and is not considered part of the invention and is therefore not described herein.

Finally, in order to obtain a flexible system it is important that the switching of the oscillators is made as quick as possible so that as little time as possible is lost in this process. Hence, it is preferred to use a modified, switched oscillator having as short a switching time as possible in the interdiction apparatus described herein.

Thus, a coding system for jamming cable television programs has been described. The system provides a more flexible and efficient jamming by means of using oscillators being capable of covering wider frequency bands than conventional voltage controlled oscillators. For this purpose modified, switched oscillators have been found to be particularly useful.

What is claimed is:

1. A cable television interdiction apparatus comprising at least one oscillator arranged for jamming different television channels transmitted in a cable television system, wherein at least one of said at least one oscillator comprises a switched part and a fixed part, where the switched part is connected to receive a control signal for changing a portion of the switched part to another portion thereof, in particular for changing the configuration of the switched part to another configuration, an oscillating electric circuit being formed by the fixed part and at each instant only one of said portions of the switched part, whereby the oscillating circuit will oscillate at different frequency bands when supplied with the control signal.

2. An apparatus according to claim 1, comprising at least two identical oscillators, each one connected to be individually controlled by different control signals.

3. An apparatus according to claim 1, where the number of oscillators is at least two, a first oscillator is arranged for jamming all channels to be jammed and additional oscillators are arranged for additional jamming of particular channels.

4. An apparatus according to claim 1, wherein the at least one oscillator also is voltage controlled by receiving a voltage control signal for adjusting its frequency continuously.

5. An apparatus according to claim 1, further comprising means in the interdiction apparatus for by-passing the input signal to a possible serially connected interdiction apparatus.

6. A method of jamming different television channels transmitted in a cable television system comprising that a jamming signal is generated by an oscillator and is added to or introduced in the signal carrying said television channels, characterized by controlling the oscillator by means of a switching signal for controlling its basic frequency to different fixed values and a frequency signal for finely and/or continuously adjusting the frequency, whereby the oscillator can be controlled to jam each one of the television channels.

7. A method according to claim 6, wherein when the number of jamming oscillators is at least two, a first oscillator is used for jamming all channels to be jammed and additional oscillators are used for additional jamming of particular channels.

8. An apparatus for jamming different television channels transmitted in a cable television system comprising oscillators supplying periodic jamming signals for a controlled jamming of the television channels, the television channels comprising frequencies that cover a wide frequency range, wherein each oscillator is controllable to oscillate at the frequencies of all the channels.

9. An apparatus according to claim 8, wherein each oscillator is controllable to oscillate at every frequency in a frequency range from a first frequency to a frequency corresponding to several times the first frequency, in particular at least four times the first frequency.

10. An apparatus according to claim 8, comprising individual control lines connected to each oscillator and control means connected to the control lines for supplying control signals thereon for controlling the frequency of each oscillator individually to adopt cyclically in time frequencies of an own predetermined series of frequencies of the television channels, each such series comprising frequencies that substantially cover said wide frequency range of all television channels.

11. A method of jamming different television channels transmitted in a cable television system by generating periodic jamming signals by oscillators and adding to or introducing the jamming signals to a signal carrying the television signals, for a controlled jamming of the television channels, the television channels comprising frequencies that cover a wide frequency range, the method comprising the step of controlling each oscillator individually to adopt cyclically in time frequencies of an own predetermined series of frequencies of the television channels, each such series comprising frequencies that substantially cover said wide frequency range of all television channels.

* * * * *